(12) United States Patent
Parker (10) Patent No.: US 8,414,049 B2
(45) Date of Patent: Apr. 9, 2013

(54) VEHICLE CARGO SYSTEM WITH MULTI-FUNCTION TONNEAU COVER

(75) Inventor: Grey B. Parker, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/879,197

(22) Filed: Sep. 10, 2010

(65) Prior Publication Data

US 2012/0061985 A1 Mar. 15, 2012

(51) Int. Cl.
*B60R 5/04* (2006.01)

(52) U.S. Cl. ............ 296/24.4; 296/24.43; 296/24.44; 296/37.16; 296/63

(58) Field of Classification Search ............ 296/24.4, 296/24.43, 24.44, 37.1, 37.16, 63, 64, 65.09, 296/65.16, 69; 297/15, 167
See application file for complete search history.

(56) References Cited

U.S. PATENT DOCUMENTS

| | | | | |
|---|---|---|---|---|
| 4,277,097 A * | 7/1981 | Lalanne | ............ | 296/37.16 |
| 4,351,555 A * | 9/1982 | Hashimoto | ............ | 296/37.16 |
| 4,765,681 A | 8/1988 | Houghtaling et al. | | |
| 5,324,089 A * | 6/1994 | Schlachter | ............ | 296/37.5 |
| 5,492,257 A * | 2/1996 | Demick | ............ | 224/275 |
| 6,065,794 A * | 5/2000 | Schlachter | ............ | 296/37.6 |
| 6,085,666 A * | 7/2000 | Anderson et al. | ............ | 108/44 |
| 6,231,101 B1 * | 5/2001 | Kamida et al. | ............ | 296/63 |
| 6,253,943 B1 * | 7/2001 | Spykerman et al. | ............ | 220/6 |
| 6,336,670 B1 * | 1/2002 | Savås | ............ | 296/37.16 |
| 6,497,445 B1 | 12/2002 | Combs, II | | |
| 6,702,355 B1 * | 3/2004 | Price et al. | ............ | 296/37.16 |
| 6,733,046 B1 * | 5/2004 | Rief | ............ | 285/276 |
| 6,874,667 B2 * | 4/2005 | Dykstra et al. | ............ | 224/498 |
| 7,086,678 B2 * | 8/2006 | Schlecht | ............ | 296/24.43 |
| 7,159,922 B2 * | 1/2007 | Iyoda et al. | ............ | 296/66 |
| 7,201,426 B2 * | 4/2007 | Villeminey | ............ | 296/65.09 |
| 7,320,501 B2 | 1/2008 | Keyser et al. | | |
| 7,762,604 B1 * | 7/2010 | Lindsay | ............ | 296/64 |
| 7,806,453 B2 * | 10/2010 | Aebker | ............ | 296/37.16 |
| 7,959,230 B2 * | 6/2011 | Hentges et al. | ............ | 297/378.12 |
| 2005/0253406 A1 | 11/2005 | Faubert et al. | | |

* cited by examiner

*Primary Examiner* — Glenn Dayoan
*Assistant Examiner* — Gregory Blankenship
(74) *Attorney, Agent, or Firm* — Rankin, Hill & Clark LLP (57) ABSTRACT

A tonneau cover assembly provided in a vehicle including a panel hingedly attached to a vehicle seat, and a release assembly with an actuating mechanism provided on the panel. The actuating mechanism is connected to a panel lock assembly and a seat lock assembly which are provided to selectively lock the panel and the vehicle seat in place. Actuation of the actuating mechanism causes the lock assemblies to release, thereby allowing rotation of the panel about the hinged attachment and folding of the vehicle seat from a seating position to a folded-forward position.

19 Claims, 4 Drawing Sheets

VEHICLE CARGO SYSTEM WITH MULTI-FUNCTION TONNEAU COVER

BACKGROUND

The present disclosure generally relates to a multi-function tonneau cover, and more particularly to a multi-function tonneau cover for use in a vehicle cargo system.

To improve vehicle utility, vehicle designers have been working to increase the customizability of vehicle cargo systems. Particularly, vehicle cargo systems allowing for the customization of cargo space size and privacy have been designed and implemented. The vehicle cargo systems are generally, though not always, provided at a rear portion of the vehicle, and may include an enclosed trunk in a sedan or coupe, or a selectively opened/closed cargo area in minivans, sports-utility and hatchback vehicles. The selectively opened/closed cargo areas may be closed off from a passenger compartment using a rigid or flexible tonneau cover. Additionally, vehicle cargo space customization may be accomplished using movable or foldable seats, such as rear vehicle seats in which a seat back can fold forward and downward while a seat cushion or bottom moves downward.

However, known customizable vehicle cargo systems may still present difficulties related to operation for a user. Furthermore, the known vehicle cargo systems may offer a limited level of customizability, and may not increase the level of durability of the vehicle cargo space.

SUMMARY

According to one aspect, a tonneau cover is attached to a vehicle seat having a seat lock assembly for selectively locking the vehicle seat in an upright position. The tonneau cover includes a panel attached to the vehicle seat and a release assembly connected to the seat lock assembly. The release assembly is configured to release the seat lock assembly to allow the vehicle seat back to fold forwardly relative to a seat bottom when the release assembly is actuated. The release assembly is actuated by an actuating mechanism disposed on the panel.

According to another aspect, a vehicle cargo system having a cargo space defined by a vehicle seat and a rear vehicle door includes a seat lock assembly for selectively locking the vehicle seat in an upright position, a tonneau cover panel attached to the vehicle seat, and a release assembly connected to a seat lock assembly. The release assembly is configured to release the seat lock assembly to allow the vehicle seat back to fold forwardly relative to a seat bottom when the release assembly is actuated. The release assembly is actuated by an actuating mechanism disposed on the panel.

According to yet another aspect, a release assembly for use with a vehicle tonneau cover having a panel hingedly attached to a vehicle seat with a seat lock assembly for selectively locking the vehicle seat in an upright position includes an actuating mechanism configured to be provided in the panel, and a vehicle seat lock assembly connecting cable operably connecting the actuating mechanism to a vehicle seat lock assembly. Actuation of the actuating mechanism causes the vehicle seat lock assembly connecting cable to release the vehicle seat lock assembly to allow the vehicle seat to fold forwardly.

DETAILED DESCRIPTION

The description and drawings herein are merely illustrative and various modifications and changes can be made in the structures disclosed without departing from what is defined in the appended claims. As used herein, all references to directions are made with respect to a driver orientation within a vehicle and should not be construed as limiting the claims appended hereto. Like numbers refer to like parts throughout the several views.

Figure 1A:
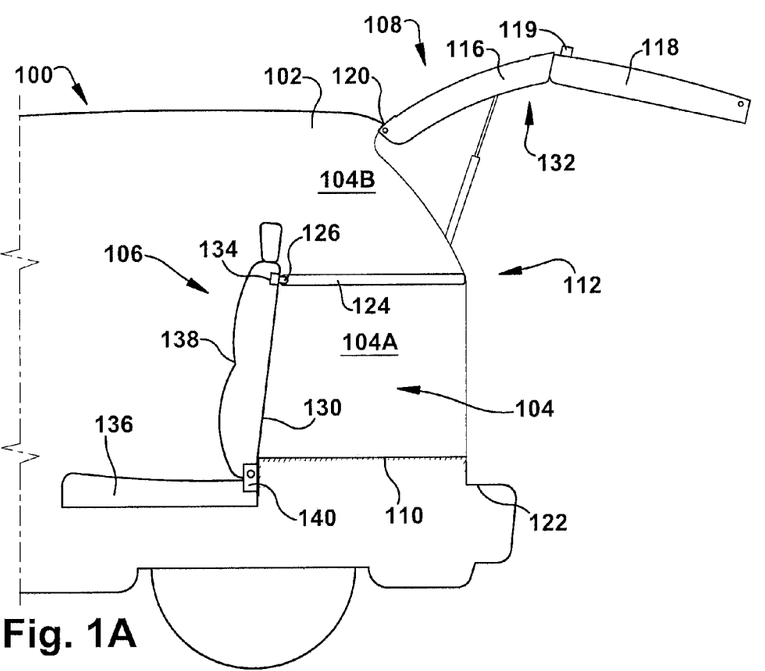
FIG. 1A is a side view illustrating a dual-mode hatchback vehicle including a vehicle cargo system with a multi-function tonneau cover with a tailgate open in a cargo mode.
Figure 1B:
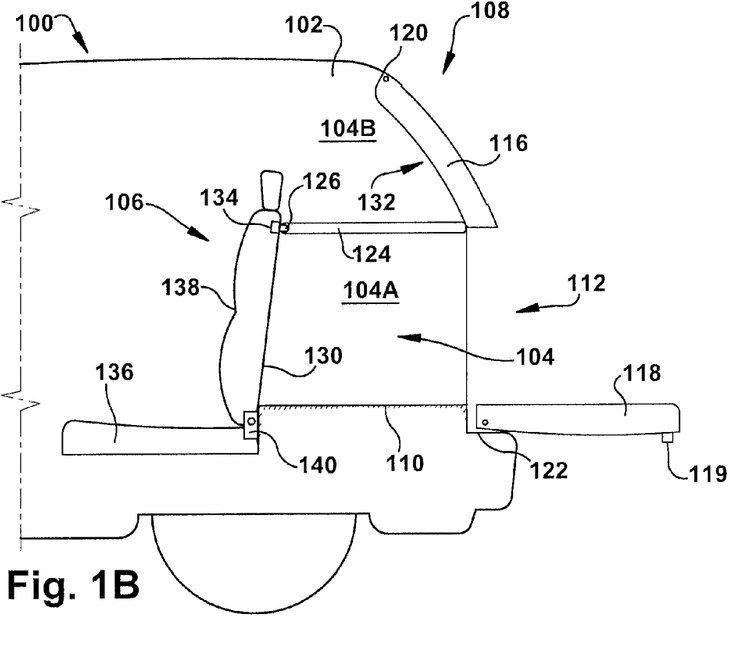
FIG. 1B is a side view illustrating the dual-mode hatchback vehicle with the tailgate open in a trunk mode.

FIGS. 1A and 1B illustrate an exemplary vehicle 100, which is a hatchback-type vehicle, having a body 102 defining a cargo space 104 in a rear portion thereof. The cargo space 104 is selectively bounded at a front end by a vehicle seat 106 and at a rear end by a tailgate, such as the illustrated dual-mode tailgate 108, and is bounded along a bottom by a vehicle floor 110 and along side and top ends by interior surfaces of the vehicle body 102. The dual-mode tailgate 108 selectively encloses the cargo space 104 at a tailgate opening 112 defined in the vehicle body 102 at a rear end thereof. As is described in further detail below, the dual-mode tailgate 108 is openable into a cargo mode (FIG. 1A) and a trunk mode (FIG. 1B). Furthermore, the cargo space 104 is selectively divided into a lower region 104A and an upper region 104B by a tonneau cover assembly 114, and can be expanded by folding the vehicle seat 106 forward in a manner described in further detail below.

The dual-mode tailgate 108 is formed of an upper tailgate panel 116, a lower tailgate panel 118, an operational lever 119, a cargo hinge 120, and a trunk hinge 122. The cargo hinge 120 is disposed on the vehicle body 102 along and adjacent to an upper edge of the tailgate opening 112 and hingedly attaches the upper tailgate panel 116 to the vehicle body 102. The trunk hinge 122 is disposed on the vehicle body 102 along and adjacent to a lower edge of the tailgate opening 112 and selectively hingedly attaches the lower tailgate panel 118 to the vehicle body 102. Furthermore, the upper tailgate panel 116 includes a connecting assembly (not shown) along a lower edge (e.g., the edge spaced from an upper edge attached to the cargo hinge 120) thereof, and the lower tailgate panel 118 includes a complimentary connecting assembly (not shown) along an upper edge (e.g., the edge spaced from a lower edge attached to the trunk hinge 122) thereof. The operational lever 119 may be provided on either or both of the tailgate upper and lower panels 116, 116, and is operable to selectively connect and disconnect the upper and lower tailgate panels 116, 118, and to open and close the dual-mode tailgate 108 into either of the cargo mode and trunk mode.

The operation and specific structural components of the dual-mode tailgate 108 may take the form of any known dual-mode tailgate, and will therefore not be described in detail herein. It is noted that the upper tailgate panel 116 is selectively integrally connected to the lower tailgate panel 118 through the respective connecting assemblies. To open the tailgate 108 into the cargo mode, as shown in FIG. 1A, the upper and lower tailgate panels 116, 118 are connected and caused to integrally rotate in an upward direction about the cargo hinge 120 so as to expose a substantial entirety of the tailgate opening 112 and cargo space 104 (upper and lower regions 104A, 104B). It is noted that the tailgate lower panel 118 is also disconnected from the hinged attachment to the vehicle body 102. This may be accomplished by selectively disconnecting the tailgate lower panel from the trunk hinge 122 and/or selectively disconnecting the trunk hinge 122, or a part thereof, from the vehicle body 102.

To open the tailgate 108 into the trunk mode, as shown in FIG. 1B, the upper and lower tailgate panels 116, 118 are disconnected or separated from one another, and the lower tailgate panel 118 is rotated downwardly about the trunk hinge 122 while the upper tailgate panel 116 remains in the closed position so as to expose only the cargo space lower region 104A. The opening and closing of the tailgate 108, along with the connection and disconnection of the upper and lower tailgate panels 116, 118 to each other, may be accomplished using the operational lever 119, a remote actuation mechanism (not shown) disposed within the vehicle, a keyless entry system such as a key-fob (not shown), or other known mechanism.

The dual-mode tailgate 108 provides a user with two different ways to access the cargo space 104 through the vehicle tailgate opening 112. Additionally, the vehicle seat 106 and the tonneau cover assembly 114 allow the user to customize the cargo space 104, as well as limit access to the upper region 104B of the cargo space and/or provide privacy for the lower region 104A of the cargo space 104. It is to be appreciated that the tonneau cover assembly 114, as described herein, is amenable for use with a standard tailgate, as well as the illustrated dual-mode tailgate 108, and may be used with vehicles other than the illustrated hatchback-type vehicle.

Figure 2A:
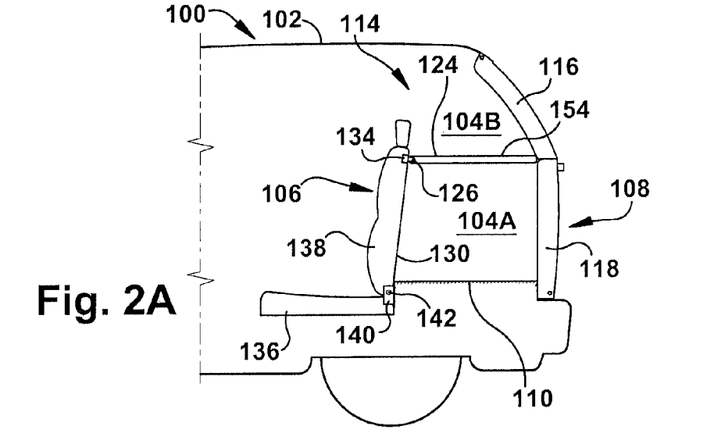
FIG. 2A is a side view of the vehicle with a vehicle seat upright and a panel of the tonneau cover extending rearwardly therefrom.
Figure 2B:
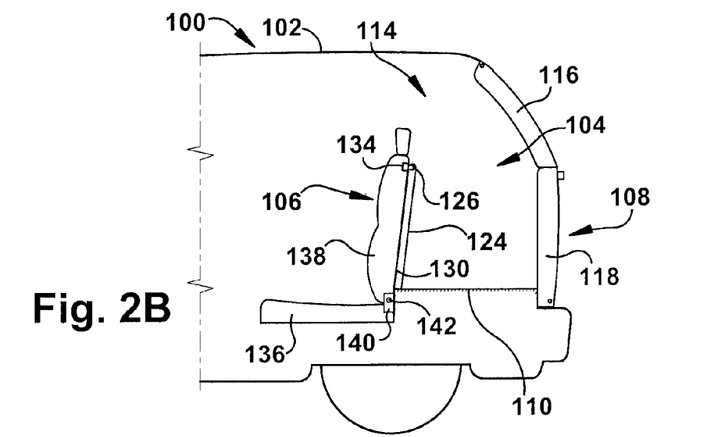
FIG. 2B is a side view of the vehicle with the vehicle seat upright and the panel of the tonneau cover resting flush against a rear surface of the vehicle seat.
Figure 2C:
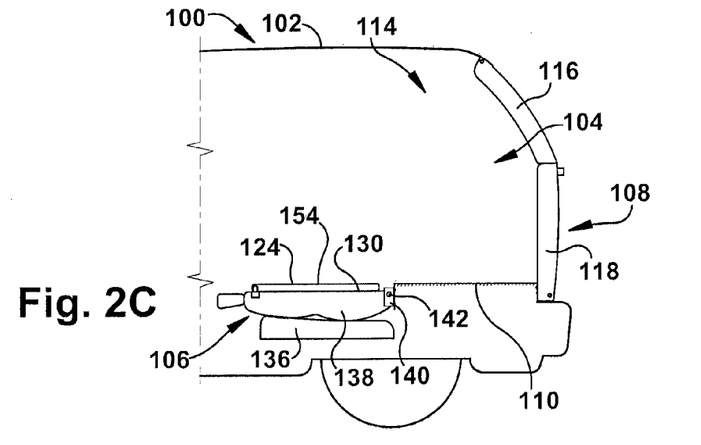
FIG. 2C is a side view of the vehicle with the vehicle seat folded forwardly and the panel of the tonneau cover resting flush against a rear surface of the vehicle seat.

As shown in FIGS. 2A-2C and 3A, the vehicle seat 106 includes a seat cushion 136, a seat back 138, and a seat stowing assembly 140 with a seat lock assembly 142. The seat back 138 is rotatably attached to the seat cushion 136 at least in part about the seat stowing assembly 140 so as to be rotatable between a generally upright or seating position (FIGS. 2A, 2B, and 3A) and a forward-folded or expanded-cargo position (FIG. 2C). The seat cushion 136 is a member configured to support posterior and leg portions of a passenger, and the seat back 138 is a member configured to support a back of the passenger.

The seat stowing assembly 140 and seat lock assembly 142 may take the form of any such assembly configured to allow the vehicle seat 106 to move between a seating position and a forward-folded position. It is noted that the seat stowing assembly 140 is operable to allow the seat to move between the seating position and the forward-folded position, and that the seat lock assembly 142 is operable to hold or lock the vehicle seat 106 in at least the seating position. It is further noted that, when moving from the seating position to the cargo position, the seat cushion 136 lowers or drops in a vertical direction and the seat back 138 rotates about the seat stowing assembly 140 until a front surface thereof is in contact and generally flush with an upper surface of the seat cushion 136 so as to fold the vehicle seat 106.

As illustrated in FIG. 2C, and described in further detail below, when in the forward-folded position, a seat back rear surface 130 is disposed vertically below the vehicle floor 110 such that an upper or outer surface of the tonneau cover assembly 114 is generally flush with the vehicle floor 110. The position of the vehicle seat 106 shown in FIG. 2C may be referred to herein as a forward-folded position, and the action of moving the vehicle seat 106 from the seating position to the forward-folded position may be referred to as the vehicle seat being folded forward, though the seat bottom may also move during the operation.

With further respect to the seat lock assembly 142, a biased lock member (hereinafter, "biased member"—not shown in drawings) may be provided with a biasing mechanism (not shown) which biases the biased member into a locked state so as to bias the seat lock assembly 142 into a locked state. More particularly, at least when the vehicle seat 106 is in the seating position, the biased member causes the seat lock assembly 142 to lock the vehicle seat 106 in the seating position. The seat lock assembly 142, the biased member, and the biasing mechanism may take the form of any known seat locking assembly, biased member, and biasing mechanism, and are therefore not discussed in detail herein. The biasing mechanism may be a spring, a resilient member, or any other mechanism for applying a biasing force on the biased member. The biased member may be a hook, a lever, etc. It is noted that the biased member is provided so as to allow for the release of the seat lock assembly 142 upon exertion of a force opposing the biased member, which allows the vehicle seat 106 to move from the seating position to the forward-folded position. The exertion of the force opposing the biasing mechanism and the biased member is described in further detail below with respect to the tonneau cover assembly 114.

The tonneau cover assembly 114, as illustrated in FIGS. 2A-2C, 3A-3B, and 3D, includes a tonneau cover panel 124 (hereinafter, "panel 124"), a tonneau hinge 126 hingedly connecting the panel 124 to the vehicle seat 106, and a tonneau cover release assembly 128 (hereinafter, "release assembly 128"). The panel 124 is a generally planar member which may be formed of a hard or rigid material. The panel 124 has a width substantially equal to a space between interior lateral side edges of the vehicle body 102 which define the cargo space 104, and a length substantially equal to a space between a rear surface 130 of the vehicle seat 106 and a front surface 132 of the dual-mode tailgate 108. The length of the panel 124 may also be less than a height of the vehicle seat rear surface 130 so as to not interfere with the vehicle floor 110 when moved to a second position, which is described in further detail below. A front edge of the panel 124 is integrated with or otherwise attached to the tonneau hinge 126.

The tonneau hinge 126 is secured to an upper portion of the vehicle seat rear surface 130 and includes a panel lock assembly 134. The tonneau hinge 126, as illustrated, laterally extends along the upper portion of the vehicle seat rear surface 130 so as to have a width substantially equal to that of the panel 124. The tonneau hinge 126 is configured to allow the panel 124 to at least rotate from a first position, illustrated in FIG. 2A, where the panel 124 extends in a substantially rearward direction from the vehicle seat rear surface 130 toward the tailgate front surface 132 so as to be generally parallel with the vehicle floor 110, to a second position, illustrated in FIG. 2B, where the panel 124 rests flush against the vehicle seat rear surface 130. It is to be appreciated that any hinge mechanism which allows rotational movement of the panel 124 relative to the vehicle seat 106 may be utilized. For example, the tonneau hinge 126 may alternatively comprise two or more hinge portions spaced from each other.

The panel 124 may be locked in at least one of the first and second positions using the panel lock assembly 134. The panel lock assembly 134 may be provided in the tonneau hinge 126, on the vehicle seat 106, or on both; and can take the form of any known hinge-locking assembly configured to lock a hingedly attached structure in a set rotational position about the hinge. The panel lock assembly 134 may also be configured to include a biasing mechanism and a biased lock member (hereinafter, "biased member") which biases the panel lock assembly 134 into a locked condition in the absence of an unlocking action or force being exerted thereon, and is operably connected to the release assembly 128 which is configured to provide the unlocking action or force. The biasing mechanism and biased member of the panel lock assembly 134 may take the form of any biasing mechanism and biased member configured to force the panel lock assembly 134 into a locked condition.

Figure 3A:
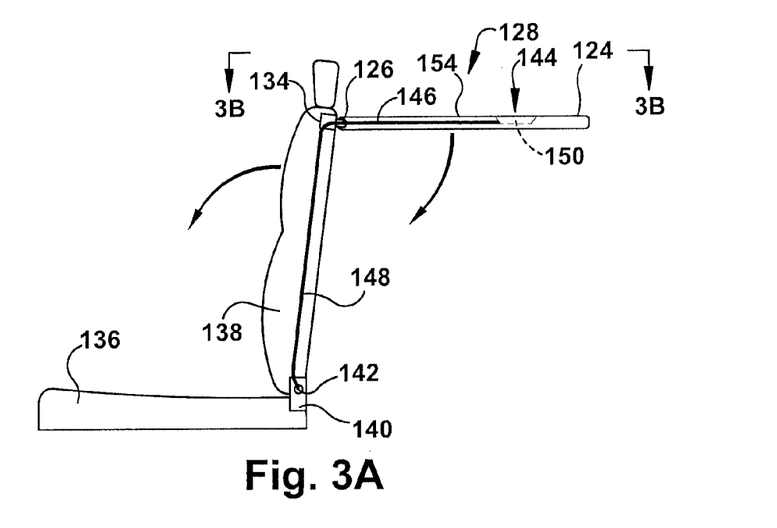
FIG. 3A is a side view of the vehicle seat and tonneau cover schematically illustrating an operational connection between a tonneau cover release lever and lock assemblies for the panel and vehicle seat.
Figure 3B:
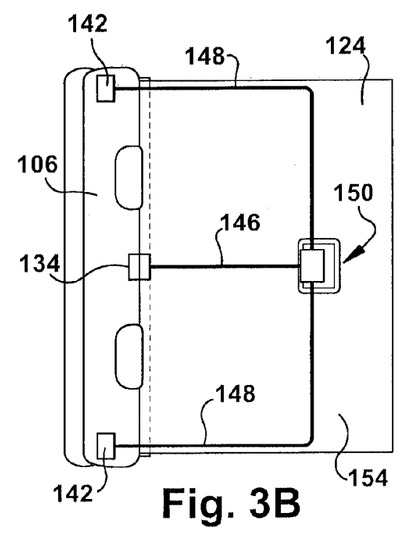
FIG. 3B is a plan view of the vehicle seat and tonneau cover schematically illustrating the operational connection between the tonneau cover release lever and lock assemblies for the panel and vehicle seat.
Figure 3C:
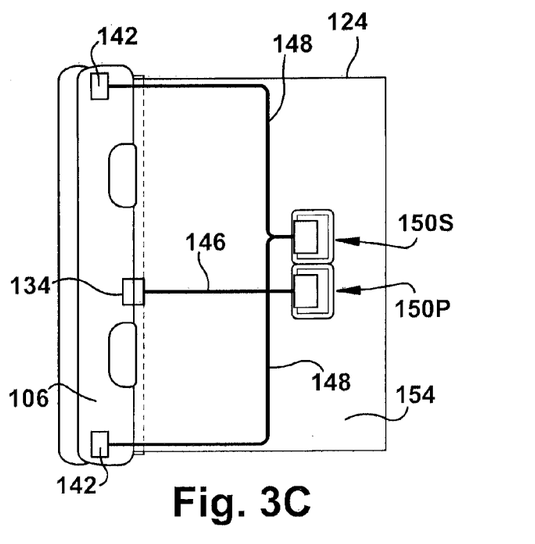
FIG. 3C is a plan view of the vehicle seat and tonneau cover schematically illustrating an operational connection between a tonneau cover panel release lever and panel lock assembly and a vehicle seat release lever and a seat lock assembly.
Figure 3D:
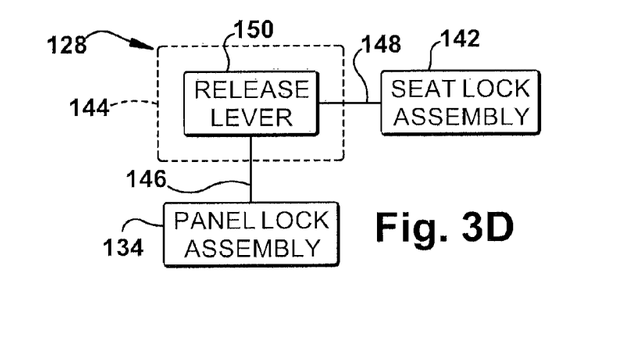
FIG. 3D is a block-schematic illustrating the operational connection between the tonneau cover release lever and lock assemblies for the panel and vehicle seat.

As schematically illustrated in FIG. 3D, the release assembly 128 includes an actuating mechanism or lever assembly 144, a panel lock assembly connecting cable 146, and a seat lock assembly connecting cable 148. The lever assembly 144 further includes at least one release lever 150 which is provided on and rotatably attached to the panel 124. The panel lock assembly connecting cable 146 connects the release lever 150 and the biased member of the panel lock assembly 134. The seat lock assembly connecting cable 148 connects the release lever 150 and the biased member of the seat lock assembly 142. As will be described below, rotation (e.g., actuation) of the release lever 150 causes at least one of the panel lock assembly connecting cable 146 and the seat lock assembly connecting cable 148 to exert a force on the respective locking assembly biased member so as to cause the associated locking assembly 134, 142 to release (from a locked condition encouraged by the respective biased member) and allow the vehicle seat 106 or panel 124 to move between the seating and forward-folded positions and the first and second positions, respectively.

Figure 4:
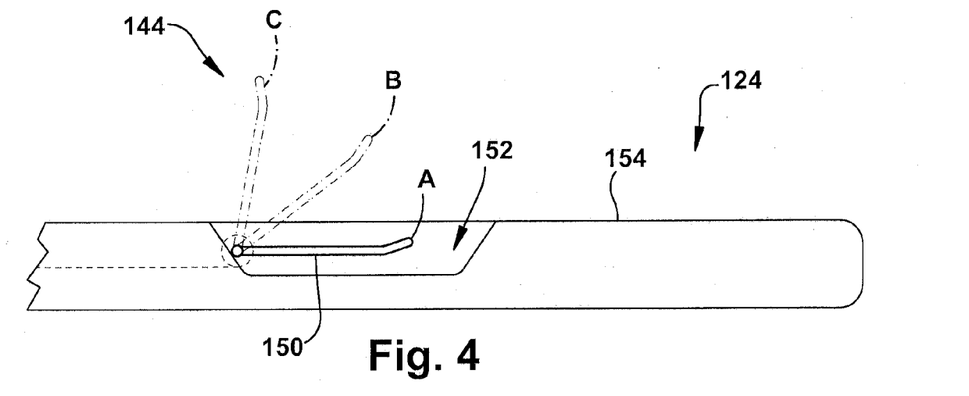
FIG. 4 is a side view of the vehicle cargo space illustrating a securing mechanism provided on the tonneau cover panel and the vehicle.

As shown in FIG. 4, the lever assembly 144 and release lever 150 are hingedly attached to the panel 124 within a lever indent 152 defined in a panel outer surface 154. The hinged attachment allows the release lever 150 to move between a first or base position A, an intermediate second position B, and a third position C. Further, the hinged attachment may include a biasing mechanism for biasing the release lever 150 toward the first position A, and may also include detent mechanisms to demarcate or indicate movement from any one position to another. Though illustrated as being provided in the lever indent 152, the release lever 150 can be disposed directly on the panel outer surface 154, on a panel inner surface, or on any other portion of the panel 124. Though described as being a lever, the lever assembly 144 and release lever 150 are exemplary actuating mechanisms for triggering an unlock condition of either or both of the panel lock assembly 134 and the seat lock assembly 142. As such, it is to be appreciated that actuating mechanisms besides the lever assembly 144 and release lever 150 may be utilized. Non-limiting examples of alternative actuating mechanisms include a button, a pull-latch, a knob, a dial, etc.

The panel lock assembly connecting cable 146 and the seat lock assembly connecting cable 148 may be Bowden cables or any other cables or mechanisms configured to transfer a force exerted on one end thereof by rotation or actuation of the release lever 150 to an opposite end attached to the respective panel lock assembly 134 and seat lock assembly 142, respectively. To protect the cables 146, 148 and improve the aesthetic appearance of the tonneau cover assembly 114, the cables 146, 148 may be fully encased by the panel 124, the tonneau hinge 126, and the vehicle seat 106.

As shown in FIG. 3B, the panel lock assembly connecting cable 146 extends from the release lever 150, through the panel 124, to the tonneau hinge 126 such that the release lever 150 is operably connected to the panel lock assembly 134 and the biased member of the panel lock assembly 134 through the panel lock assembly connecting cable 146. The seat lock assembly connecting cable 148 extends from the release lever 150, through the panel 124, to the vehicle seat 106. More particularly, the seat lock assembly connecting cable 148 also extends through the vehicle seat 106 to the seat lock assembly 142 so as to operably connect the release lever 150 to the seat lock assembly 142.

As illustrated, a single panel lock assembly connecting cable 146 and two seat lock assembly connecting cables 148 are provided. However, it is to be appreciated that fewer or more connecting cables 146, 148 may be provided depending on the precise configuration of the tonneau cover assembly 114 and the vehicle components. It is also to be appreciated that the panel lock assembly 134 and the seat lock assembly 142 may include more than one such assembly. For example (as illustrated), a first seat lock assembly 142 may be provided on a first lateral side of the vehicle seat 106 and a second seat lock assembly 142 may be provided on a second, opposite, lateral side of the vehicle seat 106. Further, if the vehicle seat 106 is divided into two or more seats, one seat lock assembly 142 may be provided on each lateral side of each divided portion of the vehicle seat 106.

Furthermore, the panel lock assembly 134 may include a first panel lock assembly on a first lateral side of the tonneau hinge 126 and a second panel lock assembly on a second, opposite, lateral side of the tonneau hinge 126. In a configuration where more than one tonneau hinge 126 is provided, each tonneau hinge 126 may be provided with one or more panel lock assembly 126. When more than one panel lock assembly 134 and seat lock assembly 142 are provided, additional panel lock assembly connecting cables 146 and seat lock assembly connecting cables 148 may be provided.

The panel lock assembly connecting cable 146 and the seat lock assembly connecting cable 148 are configured such that a rotation of the release lever 150 (e.g., actuation of the release assembly 128) causes the panel lock assembly connecting cable 146 and the seat lock assembly connecting cable 148 to exert a proportional pulling force on the biased member of the associated panel lock assembly 134 and the seat lock assembly 142. With particular reference to FIG. 4, each of the connecting cables 146, 148 are secured to the release lever 150 such that rotation of the release lever 150 may cause a pulling tensile force to be exerted on each of the connecting cables 146, 148. The pulling tensile force on each of the connecting cables 146, 148, in turn, applies a pulling force on the biased member associated with the respective panel lock assembly 134 and seat lock assembly 142, which causes the biased member to release the panel lock assembly 134 and seat lock assembly 142 from the locked condition. This allows the panel 124 to rotate about the tonneau hinge 126 and the vehicle seat 106 to move between the seating position and the forward-folded position.

To allow for added customizability of the cargo space 104, the release lever 150 and connecting cables 146, 148 may be provided to allow for the selective separate release of the panel lock assembly 134 and the seat lock assembly 142. Particularly, the cargo space 104 can be configured to have the vehicle seat 106 in the seating position and the panel 124 in the first position (FIG. 2A), the vehicle seat 106 in the seating position and the panel 124 in the second position (FIG. 2B), and to have the vehicle seat 106 in the forward-folded position and the panel 124 in the second position (FIG. 2C).

With respect to the configuration shown in FIG. 2A, it is noted that the vehicle seat 106 and the panel 124 bound the cargo space 104 in the lower region 104A. Accordingly, the vehicle seat 106 and the panel 124 provide for a private cargo space 104 in the lower region 104A. Specifically, when the panel 124 is in the first position, the lower region 104A of the cargo space 104 is substantially enclosed by the vehicle floor 110, the panel 124, the vehicle seat rear surface 130, and a front surface of the tailgate 108 (specifically the front surface of the tailgate lower panel 118). Accordingly, the lower region 104a of the cargo space 104 is substantially blocked from view with respect to an individual looking into a vehicle interior through a vehicle window from an area outside of the vehicle 100.

It is noted that the panel 124 is provided such that a distal end spaced from an end attached to the tonneau hinge 126 meets the dual-mode tailgate 108 at a position substantially corresponding to the point of contact between the tailgate upper panel 116 and the tailgate lower panel 118. In this regard, the panel 124 may, directly or indirectly, make contact with the tailgate upper panel 116, the tailgate lower panel 118, or both. As an alternative, the panel 124 may meet the tailgate upper panel 116 at a position disposed above the contact point between the tailgate upper and lower panels 116, 118. Other positions of the panel 124 may also be amenable for use with the cargo system described herein, and the panel 124 may be positioned in any manner such that opening of the tailgate lower panel 118 in the trunk mode allows access to the entire lower region 104A of the cargo space 104. It is also noted that the upper region 104B, when the panel 124 is in the second position (e.g., the configuration shown in FIG. 2A), may be considered to be a part of the passenger compartment.

With respect to the configuration shown in FIG. 2B, it is noted that the cargo space 104 includes both the lower and upper regions 104A, 104B. While this configuration allows for added height in the cargo space 104, the panel 124 does not allow for privacy of belongings stored in the lower and upper regions 104A, 104B of the cargo space 104. Similarly, when configured as shown in FIG. 2C, the cargo space 104 is expanded in a forward direction of the vehicle 100, though the panel 124 is not situated so as to provide privacy for belongings stored therein.

The panel lock assembly 134 and the seat lock assembly 142 may be operable to lock the panel 124 and vehicle seat 106 in any position. The operational description made below considers that the vehicle seat 106 is locked in the seating position and the panel 124 is locked in the first position. The changing configurations are actuated by the lever assembly 144, and particularly the release lever 150, which releases the panel lock assembly 134 and the seat lock assembly 142 to allow for the panel 124 and the vehicle seat 106 to change positions.

To further improve the customizability of the cargo space 104, the lever assembly 144 and release lever 150 are operable to selectively release either or both of the panel lock assembly 134 and the seat lock assembly 142. For example, in the embodiment illustrated in FIGS. 3B and 4, the panel lock assembly connecting cable 146 and the biased member of the panel lock assembly 134 are provided such that, when the release lever 150 is moved into the second position B illustrated in FIG. 4, the pulling tensile force exerted on the panel lock assembly connecting cable 146 and translated to the biased member of the panel lock assembly 134 is sufficient to counteract the force of the biasing mechanism so as to release the panel lock assembly 134 from the locked condition. Release of the release lever 150 causes the biasing mechanism to bias the biased member to the locked condition, which also results in the release lever 150 returning to the first position A.

Further, the seat lock assembly connecting cable 148 and the biased member of the seat lock assembly 142 are provided such that, when the release lever 150 is in the second position B, any pulling tensile force (if any pulling tensile force is present) exerted on the seat lock assembly connecting cable 148 and translated to the seat lock assembly 142 is insufficient to counteract the biasing force of the biasing mechanism of the seat lock assembly 142 such that the seat lock assembly 142 remains in the locked condition. As such, when the release lever 150 is moved to the second position B, the panel 124 is released from a locked condition and is free to rotate about the tonneau hinge 126 while the vehicle seat 106 remains locked in the seating position. Accordingly, the cargo space 104 configuration can change from a state shown in FIG. 2A to that shown in FIG. 2B.

The seat lock assembly connecting cable 148 and the biased member of the seat lock assembly 142 are provided such that only when the release lever 150 is moved to the third position C is the pulling tensile force exerted on the seat lock assembly connecting cable 148 and translated to the biased member of the seat lock assembly 142 sufficient to counteract the force of the biasing mechanism of the seat lock assembly 142 so as to release the seat lock assembly 142 from the locked condition. As such, when the release lever 150 is moved to the third position, the vehicle seat 106 is free to move from the seating position to the forward-folded position. Release of the release lever 150 causes the biasing mechanism to bias the biased member to the locked condition, which also results in the release lever 150 returning to the first position A. As the third position C of the release lever 150 is past the second position B (when starting at the first position A), the panel lock assembly 134 is also unlocked. As such, actuation or rotation of the release lever 150 to the third position C causes both the vehicle seat 106 and panel 124 to be free to move such that the vehicle seat 106 can be placed in the forward-folded position and the panel 124 can be placed in the second position. Accordingly, the cargo space 104 configuration can change from a state shown in FIG. 2A or 2B to that shown in FIG. 2C.

As an alternative, the tonneau cover assembly 114 can be configured such that the panel lock assembly 134 and the seat lock assembly 142 are simultaneously released or unlocked. In such a configuration, the connecting cables 146 and biased members associated with each of the panel lock assembly 134 and the seat lock assembly 142 are provided such that movement or actuation of the release lever 150 from the first position A to another set position (which may be the second position B, the third position C, or any other position) causes the pulling tensile force exerted on the panel lock assembly connecting cable 146 and translated to the biased member of the panel lock assembly 134, as well as the pulling tensile force exerted on the seat lock assembly connecting cable 148 and translated to the biased member of the seat lock assembly 142, to be sufficient to counteract the force of the biasing mechanism so as to release the panel lock assembly 134 and the seat lock assembly 142 from their locked conditions. Accordingly, in this configuration, actuation of the release lever 150 simultaneously releases both the panel lock assembly 134 and the seat lock assembly 142, allowing the cargo space 104 to be reconfigured from the configuration shown in FIG. 2A to that of FIG. 2C upon actuation of the release lever 150.

As an additional alternative, the lever assembly 144 of the tonneau cover assembly 114 can be provided with a panel release lever 150P and a seat release lever 150S, as shown in FIG. 3C. In this configuration, the panel lock assembly connecting cable 146 is connected to the panel release lever 150P and the biased member of the panel lock assembly 134, and the seat lock assembly connecting cable 148 is connected to the seat release lever 150S and the biased member of the seat lock assembly 142. Actuation or rotation of the panel release lever 150P causes the panel lock assembly 134 to release from the locked condition and actuation or rotation of the seat release lever 150S causes the seat lock assembly 142 to release from the locked condition.

The tonneau cover assembly 114 may also be provided with a panel securing mechanism configured to selectively engage a tailgate or cargo space securing mechanism and a vehicle seat securing mechanism. The panel securing mechanism may be provided to secure the panel 124 in either of the first or second positions through engagement with the tailgate 108 and/or sidewalls defining the cargo space 104, and the vehicle seat 106.

It is noted that, in addition to increasing the customizability of the cargo space 104, the tonneau cover assembly 114 disclosed herein also serves to provide a protective cover over the vehicle seat rear surface 130. As shown in FIG. 20, the tonneau cover assembly 114, when in the second position with the vehicle seat 106 folded-forwardly, is disposed such that the panel outer surface 154 is level or substantially level with the vehicle floor 110. Accordingly, the panel 124 may be formed of a sufficiently durable material so as to serve as a floor in the cargo space 104 without sustaining damage.

Furthermore, the tonneau cover assembly 114 is described above as employing a panel 124 formed of a hard or rigid material. It is to be appreciated that the panel 124 may be formed of any suitable material, such as plastic, metal or wood, and may alternatively be formed of a flexible plastic material. Additionally, though the panel 124 is described as being a planar member, the panel 124 need not be perfectly planar. However, to facilitate the use of the panel outer surface 154 as a portion of the cargo space floor 104, the panel outer surface 154 may be provided as a planar surface.

As described above, the release assembly 128 provides an operable mechanical connection between the release lever 150 and the lock assemblies 134, 142. However, the release assembly 128 may utilize any other manner of operable connection, such as an electrical or wireless connection. Further, insofar as the release assembly 128 is described as incorporating a lever, the actuating mechanism associated therewith may be provided by any other actuating mechanism, such as a knob, button, etc. The term "actuating mechanism" is believed to encompass any and all actuating mechanisms, including the above-described lever.

References above to "the vehicle seat 106" and "the panel 124", though made in the singular tense, do not necessarily refer to a single article. Rather, the vehicle seat 106 may be separated pilot seats or divided bench seats, and the panel 124 may be divided according to the vehicle seat 106 arrangement or some other arrangement. In such arrangements, the release lever 150 may be operable to lock and unlock all of the vehicle seats and/or all of the panels. Alternatively, each of the seats and/or panels may be unlocked separately. Additionally, though the above vehicle 100 is described and illustrated as a hatchback-type vehicle, any other vehicle may be amenable to the present disclosure.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A tonneau cover attached to a vehicle seat having a seat lock assembly for selectively locking the vehicle seat in an upright position, comprising:
    a panel attached to the vehicle seat, wherein the panel is hingedly attached to the vehicle seat to be movable between a first position where the panel extends rearwardly from the vehicle seat and a second position where the panel rests flush against a rear surface of the vehicle seat back;
    a release assembly connected to the seat lock assembly and configured to release the seat lock assembly to allow the vehicle seat to fold-forward when the release assembly is actuated, the release assembly being actuatable by an actuating mechanism disposed on the panel; and
    a panel lock assembly configured to selectively lock the panel in the first position, and wherein the release assembly is further connected to and configured to release the panel lock assembly to allow the panel to move from the first position to the second position when the release assembly is actuated by the actuating mechanism.

2. The tonneau cover according to claim 1, wherein actuation of the release assembly by the actuating mechanism substantially simultaneously releases the panel lock assembly and the seat lock assembly.

3. The tonneau cover according to claim 2, wherein the release assembly actuating mechanism is a release lever.

4. The tonneau cover according to claim 1, wherein the release assembly actuating mechanism comprises a release lever movable between a first position, a second position, and a third position, and
    when the release lever is in the first position, the seat lock assembly locks the vehicle seat in a seating position and the panel lock assembly locks the panel in the first position,
    when the release lever is in the second position, the seat lock assembly locks the vehicle seat in the seating position and the release assembly is actuated to release the panel lock assembly to allow the panel to move from the first position to the second position, and
    when the release lever is in the third position, the release assembly is actuated to release both the seat lock assembly and the panel lock assembly such that the vehicle seat folds forwardly and the panel moves from the first position to the second position.

5. The tonneau cover according to claim 1, wherein the release assembly actuating mechanism comprises a panel lever and a seat lever, wherein the release assembly is actuated to release the panel lock assembly by the panel lever and the seat lock assembly by the seat lever.

6. A vehicle cargo system having a cargo space defined by a vehicle seat and a rear vehicle door, comprising:

a seat lock assembly for selectively locking the vehicle seat in an upright position;

a tonneau cover panel attached to the vehicle seat, wherein the panel is hingedly attached to the vehicle seat to be movable between a first position where the panel extends rearwardly from the vehicle seat to the rear vehicle door, and a second position where the panel rests flush against a rear surface of a vehicle seat back;

a release assembly connected to the seat lock assembly and configured to release the seat lock assembly to allow the vehicle seat to fold-forward when the release assembly is actuated, the release assembly being actuatable by an actuating mechanism; and a panel lock assembly configured to selectively lock the panel in the first position, wherein the release assembly is further connected to and configured to release the panel lock assembly to allow the body panel to move from the first position to the second position when the release assembly is actuated.

7. The vehicle cargo system according to claim 6, wherein actuation of the release assembly substantially simultaneously releases the panel lock assembly and the seat lock.

8. The vehicle cargo system according to claim 7, wherein the release assembly actuating mechanism is a release lever.

9. The vehicle cargo system according to claim 6, wherein the release assembly actuating mechanism comprises a release lever movable between a first position, a second position, and a third position, and when the release lever is in the first position, the seat lock assembly locks the vehicle seat in a seating position and the panel lock assembly locks the panel in the first position, when the release lever is in the second position, the seat lock assembly locks the vehicle seat in the seating position and the release assembly is actuated to release the panel lock assembly to allow the panel to move from the first position to the second position, and when the release lever is in the third position, the release assembly is actuated to release both the seat lock assembly and the panel lock assembly such that the vehicle seat folds forwardly and the panel moves from the first position to the second position.

10. The vehicle cargo system according to claim 6, wherein the release assembly actuating mechanism comprises a panel lever and a seat lever, wherein the release assembly is actuated to release the panel lock assembly by the panel lever and the seat lock assembly by the seat lever.

11. The vehicle cargo system according to claim 10, wherein the rear vehicle door comprises an upper panel and a lower panel which are selectively separately openable, and a distal end of the panel spaced from an end hingedly attached to the vehicle seat meets the rear vehicle door at a position substantially corresponding to a contact point between the upper panel and lower panel of the rear vehicle door.

12. The vehicle cargo system according to claim 6, wherein the panel lock assembly is provided at least along the hinged connection between the panel and the vehicle seat.

13. The vehicle cargo system of claim 6 wherein the actuating mechanism is disposed on the panel.

14. A release assembly for use with a vehicle tonneau cover having a panel hingedly attached to a vehicle seat provided with a vehicle seat lock assembly for selectively locking the vehicle in an upright position, comprising:

an actuating mechanism;

a vehicle seat lock assembly connecting cable operably connecting the actuating mechanism to the vehicle seat lock assembly, actuation of the actuating mechanism causes the vehicle seat lock assembly connecting cable to release the vehicle seat lock assembly to allow the vehicle seat to fold forwardly; and a panel lock assembly connecting cable operably connecting the actuating mechanism to a panel lock assembly, wherein actuation of the actuating mechanism causes the panel lock assembly connecting cable to release the panel lock assembly to allow the panel to move from a first position where the panel extends rearwardly from the vehicle seat to a second position where the panel rests flush against a rear surface of a vehicle seat back.

15. The release assembly according to claim 14, wherein the actuating mechanism includes a release lever actuated through rotation thereof, and actuation of the release lever causes the vehicle seat lock assembly and the panel lock assembly to substantially simultaneously release.

16. The release assembly according to claim 14, wherein the actuating mechanism further comprises a panel lever actuated through rotation thereof and configured to be provided in the panel, and wherein actuation of the panel lever causes the panel lock assembly connecting cable to release the panel lock assembly to allow the panel to move from a first position where the panel extends rearwardly from the vehicle seat to a second position where the panel rests flush against a rear surface of a vehicle seat back.

17. A tonneau cover attached to a vehicle seat having a seat lock assembly for selectively locking a seat back of the vehicle seat in an upright position, comprising:

a panel attached to the seat back, wherein the panel is hingedly attached to the seat back to be movable between a first position where the panel extends rearwardly from the seat back in a horizontal orientation when the seat back is in the upright position and a second position where the panel rests flush against a rear surface of the seat back when the seat back is in the upright position or a stowed position;

a release assembly connected to the seat lock assembly and configured to release the seat lock assembly to allow the seat back to pivot and fold-over onto a seat base of the vehicle seat to the stowed position when the release assembly is actuated; and a panel lock assembly configured to selectively lock the panel in the first position, wherein the release assembly includes a release lever that is connected to and configured to release the panel lock assembly to allow the panel to move from the first position to the second position.

18. The tonneau cover of claim 17 wherein the panel is rotatably secured to the seat back at a fixed location on the seat back.

19. The tonneau cover of claim 17 wherein the release lever is also connected to and configured to release the seat lock assembly to allow the seat back to pivot and fold-over onto the seat base.

* * * * *